US006460815B1

(12) United States Patent
Thaler

(10) Patent No.: US 6,460,815 B1
(45) Date of Patent: Oct. 8, 2002

(54) TRIPOD ADAPTER FOR BINOCULARS

(75) Inventor: Wilfried Thaler, Kundl (AT)

(73) Assignee: Swarovski Optik KG, Absam (AT)

( * ) Notice: Subject to any disclaimer, the term of this patent is extended or adjusted under 35 U.S.C. 154(b) by 0 days.

(21) Appl. No.: 09/309,276

(22) Filed: May 11, 1999

(51) Int. Cl.⁷ ............................................. A47B 91/00
(52) U.S. Cl. .................................................. 248/187.1
(58) Field of Search ....................... 248/187.1, 222.11, 248/177.1, 220.21, 222.12; 359/420

(56) References Cited

U.S. PATENT DOCUMENTS

| | | | | |
|---|---|---|---|---|
| 2,767,989 A | * | 10/1956 | Luebbers ..................... 279/48 |
| 4,085,915 A | * | 4/1978 | Song et al. ............... 248/187.1 |
| 4,320,885 A | * | 3/1982 | Kawazoe ............... 248/222.11 |
| 4,557,451 A | | 12/1985 | Conway |
| 4,579,436 A | * | 4/1986 | Jaumann ................. 248/187.1 |
| 4,929,973 A | * | 5/1990 | Nakatani .................. 248/187.1 |
| 5,157,873 A | * | 10/1992 | Rudolf et al. .................. 51/168 |
| 5,234,296 A | * | 8/1993 | Presby et al. ............... 409/234 |
| 5,332,183 A | * | 7/1994 | Kagayama ............. 248/222.11 |
| 5,437,427 A | | 8/1995 | Johnson |
| 5,732,912 A | * | 3/1998 | Nomura et al. .......... 248/187.1 |
| 5,930,036 A | * | 7/1999 | Cluff ........................... 359/420 |
| 5,938,155 A | * | 8/1999 | Garland .................... 248/187.1 |
| 6,068,223 A | * | 5/2000 | Navarro .................... 248/187.1 |

FOREIGN PATENT DOCUMENTS

| | | | |
|---|---|---|---|
| GB | 2 269 023 | | 1/1994 |
| JP | 8-050248 | | 2/1996 |
| JP | 2000-111803 | * | 4/2000 |

* cited by examiner

*Primary Examiner*—Ramon O. Ramirez
(74) *Attorney, Agent, or Firm*—Fulbright & Jaworski, LLP

(57) ABSTRACT

A tripod adapter for firmly connecting binoculars with a tripod has a depression into which a connecting bolt present on the articulated axle of the binoculars is pushed, and a quick-acting closure for fixing the connecting bolt in the depression.

15 Claims, 2 Drawing Sheets

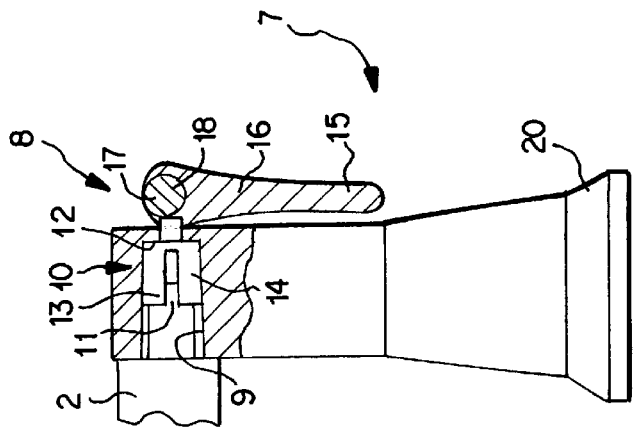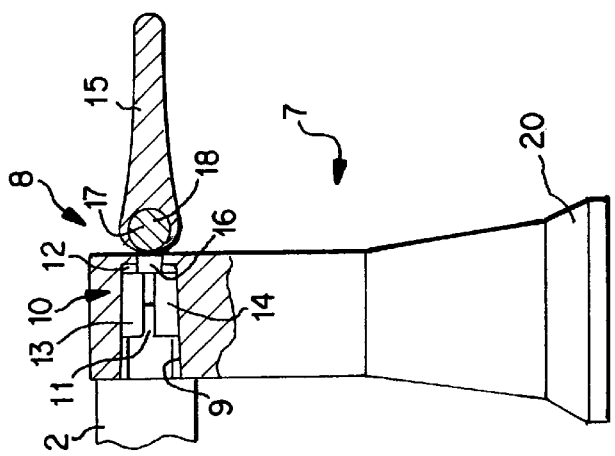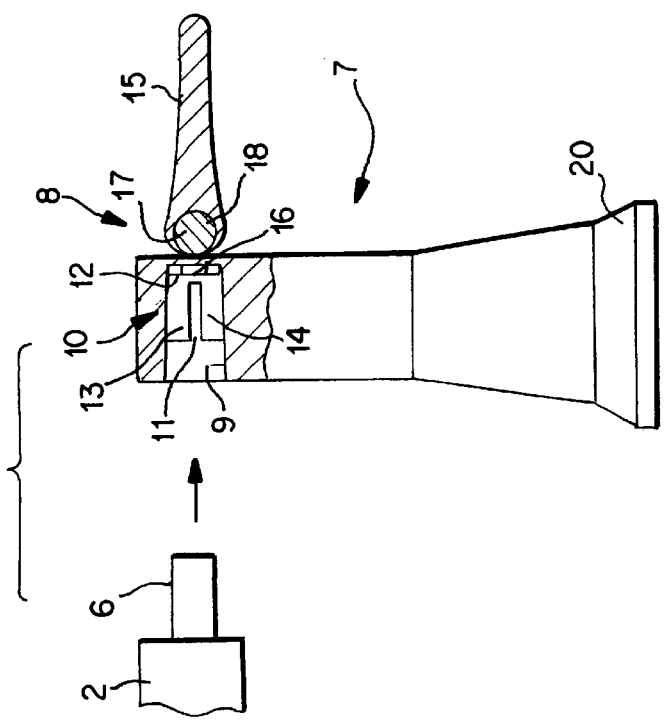

TRIPOD ADAPTER FOR BINOCULARS

This invention relates to binoculars and, more particularly, to a quick release tripod adapter for binoculars.

Conventional tripod adapters for binoculars include a fixing screw which can be screwed into a mating connecting thread formed on the articulated axle of the binoculars to affix the adapter to the binoculars. Such tripod adapters have the disadvantage that a coin or screwdriver is necessary as an additional tool for reliably fastening the adapter to the binoculars. It is also disadvantageous that it takes a relatively long time to tighten the fixing screw. Specifically with large binoculars there is very little room between the two telescope bodies, which makes it difficult to operate the fixing screw. Moreover, such conventional tripod adapters require an intermediate plate for connecting the adapter with the tripod.

The invention provides an easily handled tripod adapter for binoculars which avoids the abovementioned disadvantages of conventional tripod adapters.

In order to enhance handling, the tripod adapter is provided with a depression into which a connecting bolt located on the articulated axle of the binoculars can be inserted. The connecting bolt is then fixed in the depression of the tripod adapter with the aid of a quick-acting closure such that a firm connection is produced between the adapter and the binoculars. This arrangement makes it possible to quickly connect the binoculars with the tripod adapter and without any additional tool, and to quickly and easily release this connection. This feature holds in particular even when there is little room between the two telescope bodies such as in large binoculars.

Moreover, this arrangement offers the advantage that the tripod adapter and the binoculars are held together tightly while the operating forces of the closure are low.

According to a preferred embodiment of the inventive tripod adapter the quick acting closure is formed as a collet chuck. The adapter is then operated via a chuck lever which closes or opens the collet chuck via an eccentric.

Moreover, the tripod adapter can also be formed so that the base of the tripod adapter can be mounted on the tripod and connected therewith directly without the use of an intermediate plate.

An embodiment of the inventive tripod adapter will be described in more detail below with reference to the drawings, in which:

FIG. 2A shows a side view of the connecting bolt on the articulated axle of the binoculars and a partly sectional view of the tripod adapter;

FIG. 2B shows a side view of the connecting bolt on the articulated axle of the binoculars inserted into a tapering depression formed in the tripod adapter and engaging a sleeve member; and FIG. 2C shows the sleeve drawn into the tapering depression, the connecting bolt held within the closed jaws of the sleeve member.

Figure 1:
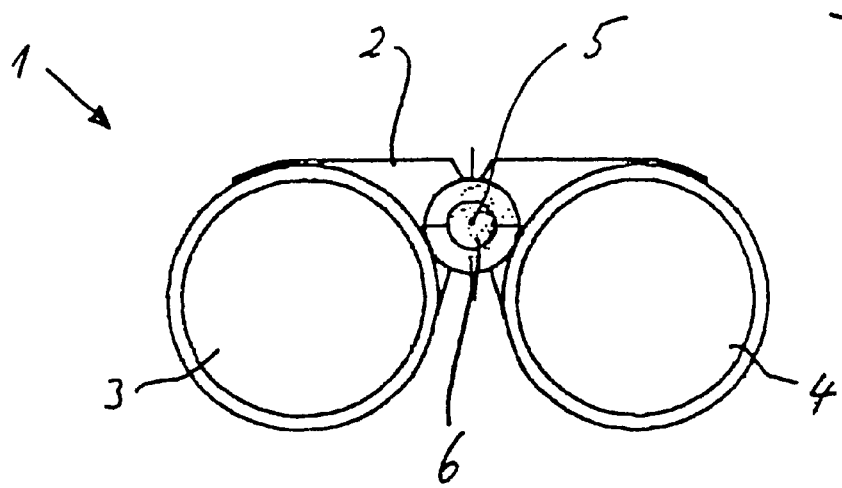
FIG. 1 shows a view of the front of binoculars.

According to FIGS. 1 and 2A–2C, binoculars 1 with two telescope bodies 3, 4 connected via jointed bridge 2 have connecting bolt 6 on the front on articulated axle 5 of jointed bridge 5.

Figure 2:
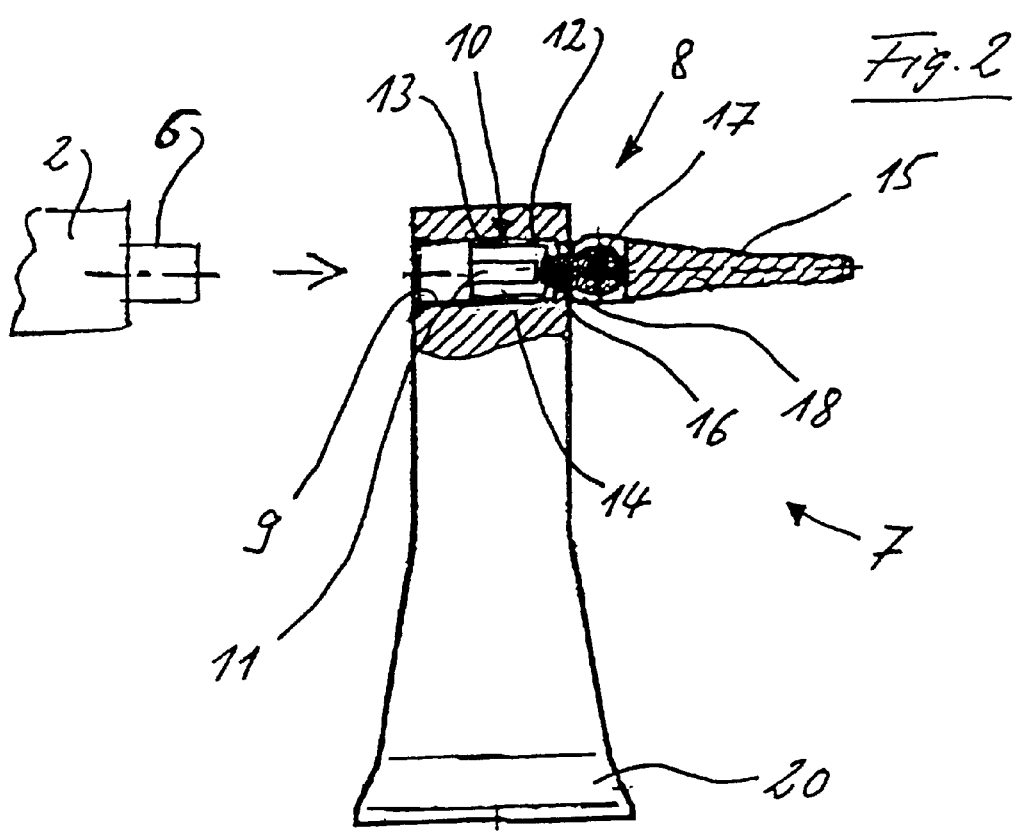
FIG. 2 shows a side view of the connecting bolt on the articulated axle of the binoculars and a partly sectional view of the tripod adapter.

According to FIG. 2A, tripod adapter 7 has in its upper end area quick-acting closure 8 that is formed, e.g., as a collet chuck. For this purpose, depression 9 extending substantially perpendicular to the longitudinal axis of tripod adapter 7 and tapering inward is provided in the upper end area of tripod adapter 7. The collet chuck is formed by sleeve 10 disposed displaceably in depression 9 and having longitudinal slots 11 extending from back area 12 of sleeve 10 to its front edge. Longitudinal slots 11 form jaws 13, 14 on sleeve 10 which close when sleeve 10 is inserted into tapering depression 9.

To shift sleeve or collet chuck 10 within depression 9, chuck lever 15 is provided, being hinged to the outwardly protruding end of tie bolt 16 to swivel around axis 17. Chuck lever 15 has eccentric 18. In the open position of collet chuck 10 shown in FIG. 2A, chuck lever 15 protrudes away from tripod 7.

To fasten binoculars 1 to tripod 7 one inserts connecting bolt 6 into forwardly pushed open sleeve 10 as shown in FIG. 2B.

When chuck lever 15 is tilted onto tripod 7, sleeve 10 is drawn into tapering depression 9 thereby closing jaws 13, 14 and thus fixing connecting bolt 6 in sleeve 10 as shown in FIG. 2C.

What is claimed is:

1. A tripod adapter for attaching binoculars to a tripod, the binoculars having a connecting bolt extending from an articulated axle of the binoculars, the tripod adapter comprising:

a vertically elongate body with (i) an upper end portion having a depression formed therein for engaging the connecting bolt of the binoculars, said depression extending in a direction substantially perpendicular to a longitudinal axis of said elongate body, and (ii) a lower base portion for engaging a corresponding mating structure of the tripod, and a quick-acting closure for selectively retaining the connecting bolt in the depression, said quick-acting closure including a collet chuck which is opened and closed by means of a chuck lever with an eccentric.

2. The tripod adapter according to claim 1 wherein said base portion comprises a rail for engaging a mating shoe portion of the tripod.

3. The tripod adapter according to claim 1 wherein said depression extends in a direction substantially perpendicular to a longitudinal axis of said tripod adapter.

4. A quick release mounting system comprising:

a pin having a first end attachable to a body to be mounted atop a platform; and an adapter including a vertically elongated body having
(i) an upper end portion having a void formed through a side wall thereof for releasably receiving and holding said pin therewithin;
(ii) a collet chuck positionable in said void for gripping said pin; and
(iii) a lower end portion fixedly engageable with said platform.

5. The quick release mounting system according to claim 4 wherein said pin is adapted to be securely mounted to and extend in an axial direction of an articulated axle of binoculars and said adapter is mountable to a tripod.

6. The quick release mounting system according to claim 4 wherein said pin is insertable into said void formed through said side wall of said adapter.

7. A quick release tripod adapter for mounting binoculars to a tripod, said tripod adapter comprising:

a vertically elongated body having a base portion mountable to and engageable with the tripod and a head portion having a void formed through a side wall of said body; and a collet chuck positionable in said void and operable by a lever for releasably gripping a pin member of the binoculars.

8. The quick release tripod adapter according to claim 7 wherein said elongated body is tapered from said base portion toward said head portion.

9. The quick release tripod adapter according to claim 7 wherein said base portion comprises a rail for engaging and mating with a shoe portion of the tripod.

10. An optical system comprising:

binoculars having a pin member extending from an articulated axle of the binoculars; and a tripod adapter for attaching the binoculars to a tripod, the tripod adapter including (i) a vertically elongated body having a base portion mountable to the tripod and a head portion having a void formed through a side wall of said body, and (ii) a collet chuck positionable in said void and operable by a lever for releasably gripping said pin member of the binoculars.

11. The optical system of claim 10 said elongated body is tapered from said base portion toward said head portion.

12. The optical system according to claim 10 wherein said base portion comprises a rail for engaging and mating with a shoe portion of the tripod.

13. The optical system of claim 10 wherein said pin member extends outwardly from a end of said binoculars.

14. The optical system of claim 10 wherein said collet chuck is operable to close opposing jaws about said pin member.

15. The optical system of claim 10 wherein said collet chuck includes opposing jaw members operable by said lever for releasably gripping said pin member of the binoculars thereby holding said binoculars in a direction axial to said elongated body.

* * * * *